US008635265B2

(12) United States Patent
Reeves et al.

(10) Patent No.: US 8,635,265 B2
(45) Date of Patent: Jan. 21, 2014

(54) COMMUNICATING BETWEEN A SERVER AND CLIENTS

(75) Inventors: Damian John Reeves, Cambridge (GB); Ben Ross Mansell, Cambridge (GB); Owen John Garrett, Ely (GB); Crispin Edward Harold Flowerday, Cambridge (GB)

(73) Assignee: Riverbed Technology, Inc., San Francisco, CA (US)

( * ) Notice: Subject to any disclaimer, the term of this patent is extended or adjusted under 35 U.S.C. 154(b) by 961 days.

(21) Appl. No.: 11/124,807

(22) Filed: May 9, 2005

(65) Prior Publication Data

US 2006/0031525 A1    Feb. 9, 2006

(30) Foreign Application Priority Data

May 7, 2004  (GB) .................................. 0410151.5

(51) Int. Cl.
*G06F 15/16*        (2006.01)

(52) U.S. Cl.
USPC ....................................................... 709/203

(58) Field of Classification Search
USPC ......... 709/203, 224, 226, 223, 217, 238, 229, 709/232, 227, 225, 245, 242, 219, 220, 241, 709/240, 249, 230, 246; 718/105; 370/229, 370/401; 707/E17.12, 203, 100, 10; 711/118

See application file for complete search history.

(56) References Cited

U.S. PATENT DOCUMENTS

| 6,067,545 | A   | * | 5/2000  | Wolff .................................... 1/1 |
| 6,438,597 | B1  | * | 8/2002  | Mosberger et al. ........... 709/227 |
| 6,591,290 | B1  | * | 7/2003  | Clarisse et al. ............... 709/205 |
| 6,807,572 | B1  | * | 10/2004 | Yu .................................. 709/219 |
| 6,839,732 | B1  | * | 1/2005  | Vincent et al. ................. 709/202 |
| 7,069,498 | B1  | * | 6/2006  | Finch et al. .................... 715/234 |
| 7,359,360 | B2  | * | 4/2008  | Ronneke ....................... 370/338 |
| 2002/0138618 | A1 | * | 9/2002  | Szabo ........................... 709/225 |
| 2003/0110154 | A1 | * | 6/2003  | Ishihara et al. .................... 707/1 |
| 2004/0078495 | A1 | * | 4/2004  | Mousseau et al. ................ 710/1 |
| 2004/0111506 | A1 | * | 6/2004  | Kundu et al. ................. 709/223 |
| 2004/0268357 | A1 | * | 12/2004 | Joy et al. ....................... 718/105 |
| 2006/0085559 | A1 | * | 4/2006  | Lownsbrough et al. ...... 709/238 |
| 2007/0088822 | A1 | * | 4/2007  | Coile et al. .................... 709/224 |
| 2010/0211626 | A1 | * | 8/2010  | Li ................................. 709/203 |

FOREIGN PATENT DOCUMENTS

WO        WO 00/28433        5/2000

OTHER PUBLICATIONS

"Shared Cipher Spec Protocol". (2000). IBM Technical Disclosure Bulletin, 432, 776.*
European Search Report dated Jul. 8, 2005.

* cited by examiner

*Primary Examiner* — Asad Nawaz
*Assistant Examiner* — Saad A Waqas
(74) *Attorney, Agent, or Firm* — Park, Vaughan, Fleming & Dowler LLP

(57) ABSTRACT

Communication occurs between at least one server and a plurality of clients. Client-side connections are established between a traffic manager and clients, in response to clients making requests to communicate with a server. Server-side connections are created and maintained between the traffic manager and the server in order to service the client requests. At least one of the server-side connections is reused to service a client request.

17 Claims, 17 Drawing Sheets

Fig. 10 (807)

COMMUNICATING BETWEEN A SERVER AND CLIENTS

FIELD OF THE INVENTION

The present invention relates to communicating between at least one server and a plurality of clients.

BACKGROUND OF THE INVENTION

The Internet supports varying levels of data traffic associated with different services provided to browsing clients. For example, a web site may serve tens or several hundreds of web pages. When traffic levels to a web site are relatively low, a single computer may be used to serve web pages to browsing clients. However, when the web traffic levels are high, a single computer is no longer capable of providing quick and reliable access to web pages. The problem of scalability applies to all types of Internet services, including streaming media and content management servers, where a single Internet Protocol (IP) address may be accessed by large numbers of clients.

The data traffic load for a web site or other Internet service can be shared between several server computers, or servers, by a technique known as round-robin DNS. When a client browser initiates access to a URL, the client first obtains the IP address to which the domain name portion of the URL corresponds. The client achieves this by accessing a Domain Name Server (DNS) lookup table. In the case where several IP addresses are allocated to a domain name, all IP addresses to which the domain name corresponds are supplied to the client browser. The client browser then selects one of the IP addresses to use to access the URL. Typically, the client browser chooses an IP address at random. When a large number of browsers access the same URL simultaneously, the random selection of one of the IP addresses by each browser results in all the IP addresses being used.

Thus, using round-robin DNS, the traffic load to a web site should be spread across several web servers. However, a first problem with round-robin DNS is that if one of the web servers fails, the client browsers that select the IP address of the failed web server will not access the web site.

A second problem with round-robin DNS arises from the use of proxy caches by Internet Service Providers (ISPs). A proxy cache stores pages recently served to an ISP client. If a page is requested that is stored in a proxy cache, the ISP serves the cached version of the page in preference to making a new request to the originating site to serve the page. When a page is requested that is not stored in the proxy cache, the originally selected IP address may be used to request the originating site to serve the page. When the ISP has a large number of customers, the use of a prior selected IP address by a client browser, in preference to repeating the step of selecting an IP address, contradicts the traffic load distribution function that round-robin DNS would otherwise provide. This effectively renders sites that rely on round-robin DNS to operate dependably vulnerable to excessive traffic demands regardless of the number of servers employed to host the site.

BRIEF SUMMARY OF THE INVENTION

According to an aspect of the present invention, there is provided a method of communicating between at least one server and a plurality of clients, comprising the steps of establishing client-side connections in response to clients making requests to communicate with a server; creating and maintaining server-side connections in order to service said client requests; and reusing at least one of said server-side connections to service a client request.

WRITTEN DESCRIPTION OF THE BEST MODE FOR CARRYING OUT THE INVENTION

FIG. 1

Figure 1:
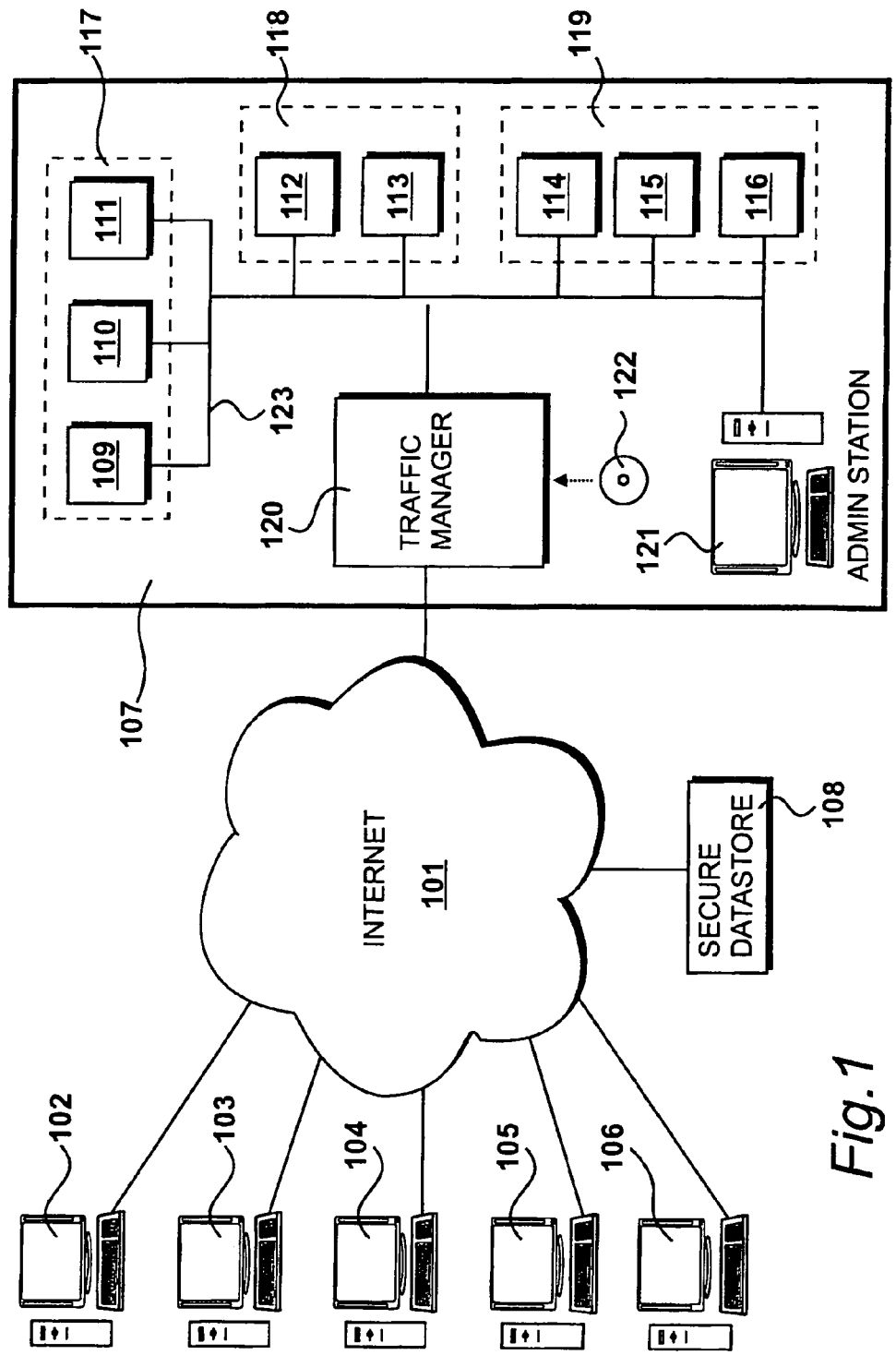
FIG. 1 shows an environment in which communication is provided between a server and browsing clients.

An environment in which communication is provided between a server and many clients is illustrated in FIG. 1. In this example, a network connection is provided via the Internet and the invention is (although not exclusively) applicable to this environment, given that situations often arise where many (many thousands for example) of browsing clients are requesting data from the same Internet address or website; whereupon a substantial resource is required at the server in order to provide service to all of these requesting browsers at an appropriate level. However, in other embodiments clients could be using other protocols such as Web-Services or SOAP, or could be HTTP clients on networks other than the Internet. The Internet is used here merely as an example of a popular application of the invention.

In this example, clients 102 to 106 are shown, although it should be appreciated that this is merely representative of the many thousands of clients requesting data from the server. These browsing clients include personal computers equipped with browsing software, such as "Internet Explorer", "Mozilla", "Firefox" and "Safari" for example. Browsing devices also include mobile wireless connected devices, such as personal digital assistants (PDAs), smart phones and any other form of equipment with Internet connection functionality.

Server 107 provides services such as the provision of webpages and secure online sales to connected clients, including clients 102 to 106. Secure data store 108 stores details concerning regular customers (in this example including some of clients 102 to 106) who have, for example, accounts relating to online sales and levels of privileged access to services provided by the site or sites hosted by server 107. A server may be any processing system configured to service client requests of some kind, such as requests for information or requests to write to a database.

Server site 107 includes physical serving devices (servers) 109 to 116 organised into three server pools consisting of, in this example, a first pool 117, a second pool 118 and a third pool 119. The first pool 117 is for the secure servers running secure protocols, suitable for online sales and other secure transactions. The second pool 118 provides dynamic webpage content requiring a relatively high level of server processing and the third pool 119 includes a collection of inexpensive commodity servers for the serving of static webpages.

A traffic management system 120 monitors client requests and directs requests to an appropriate server pool. To do this, the system is provided with functionality enabling it to analyse client requests in detail. Furthermore, additional operations are carried out by the traffic management system (during and after request analysis), in order to maintain a high number of simultaneously connected clients without overloading any of the servers 109 to 116.

In order to facilitate the configuration of the servers and the traffic management system 120, an administration station 121 is provided, having human interface peripheral equipment including a monitor and a keyboard etc.

A data-carrying medium such as a CD-ROM or DVD etc is illustrated at 122 as a means for supplying executable instructions for the traffic managing process to a traffic management platform. Alternatively, traffic managing instructions may be loaded onto the traffic management platform from the Internet and the transfer of such instructions may be controlled via the administration station 121. An network 123 connects the servers 109 to 116 with the traffic management system 120 and the Internet 101. Thus, in the embodiment, the traffic management system is implemented by a programmable platform having executable instructions installed thereon.

In an alternative embodiment, it is possible for several traffic management systems to be provided, all of which are configured to manage what is perceived as the same Internet site. Each traffic management system would be connected to all of the servers. In the following description, reference is made to a single traffic management system but it should be appreciated that the following description also applies to situations in which a plurality of traffic management systems are provided. When multiple traffic management systems are used, each system is assigned a different address or addresses, or alternatively multiple servers can share the same IP address. The URL for the site is assigned a range of addresses, one of which is selected by the client browser, resulting in the substantially random selection of systems among multiple clients, which is the technique known as round-robin DNS.

A difficulty associated with the design of sophisticated traffic management systems concerns the amount of processing overhead that is required, both in the traffic management systems and in the connected servers, to support large numbers of simultaneous client connections. Slow client connections such as those provided by dial-up modems worsen the problem because each connection is held open for the duration of a longer period of data transfer, thereby increasing the number of simultaneous connections that must be held open for the same number of connected clients.

It is well known that servers (such as servers 109 to 116) have limits as to the number of simultaneous connections that can be made. For example, in the case of the widely used APACHE webserver, a maximum number of simultaneous connections is two hundred and fifty-six and this number can be used up relatively easily when a significant number of dial-up modems are connected or when an even larger number of high-bandwidth digital subscriber line (DSL) connected clients are accessing the same webpages.

In the present embodiment, the traffic management system 120 establishes client-side connections in response to clients making requests for their respective browser to communicate with the server. In addition, the traffic management system creates and maintains server-side connections in order to service the client browser requests. Connection efficiency is improved by reusing server-side connections for one or more of the client-side connections. Furthermore, it is preferable for existing server-side connections to be reused in preference to new server-side connections being established. In this way, it is possible for the number of client-side connections to be increased for a given number of server-side connections. Furthermore, it is also possible for the overhead involved with the establishment of a server-side connection to be reduced given that connections are maintained rather than being closed down and then opened anew.

FIG. 2

Figure 2:
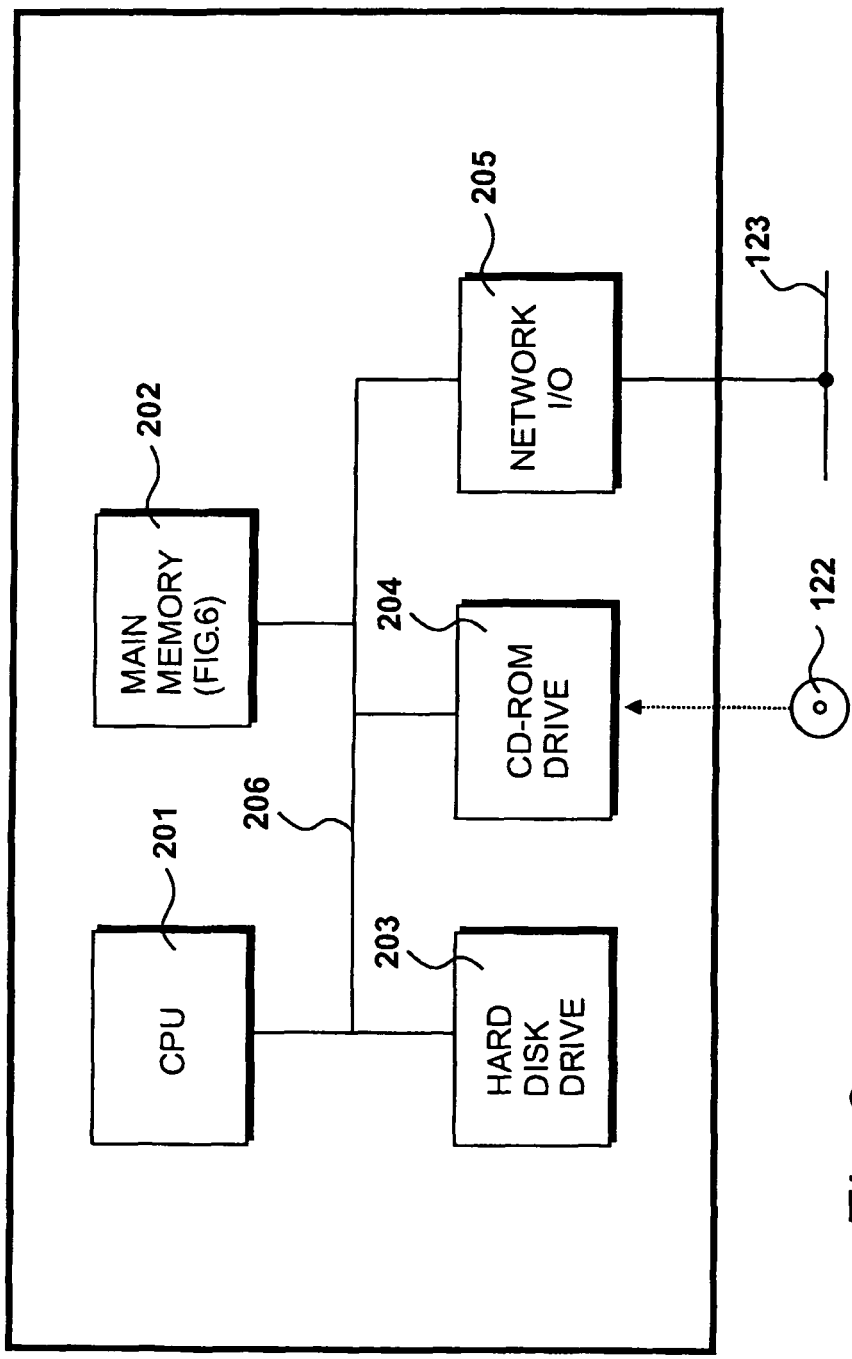
FIG. 2 shows a hardware platform for implementing traffic management instructions.

Instructions for the implementation of traffic management are executed on a hardware platform such as that illustrated in FIG. 2. The traffic management platform is controlled by the administration station 121 and therefore does not require its own output monitor or input keyboard etc. Typically, hardware of this type is in the form of a rack-mounted unit and several such units may be provided within a rack so as to provide a degree of redundancy in case of hardware failure. It should also be appreciated that servers 109 to 116 may be configured in a similar fashion.

A central processing unit 201 is provided such as a Pentium IV running at 3.2 gigahertz and including on chip primary and secondary cache, facilitating the provision of access to frequently used instructions and data.

Main memory 202 may comprise two gigabytes of dynamic RAM facilitating the storage of instructions and data to allow regular access while the system is in operation. A hard disk drive 203 of typically sixty gigabytes provides non-volatile storage of instructions and configuration data. In addition, disk 203 also provides access to infrequently used data during operation. Upon system initialisation, configuration files and executable instructions are loaded from disk drive 203 and stored in main memory 202.

For the optional loading of traffic managing instructions from data carrying media, a CD-ROM/DVD drive 204 is provided, configurable to receive instructions from an instruction carrying medium, such as disk 122. In addition, one or more network connections are provided by at least one network interface 205 thereby allowing the traffic management system to connect to the network 123 and the Internet 101. Internally, the devices 201 to 205 are connected by a data bus 206.

FIG. 3

Figure 3:
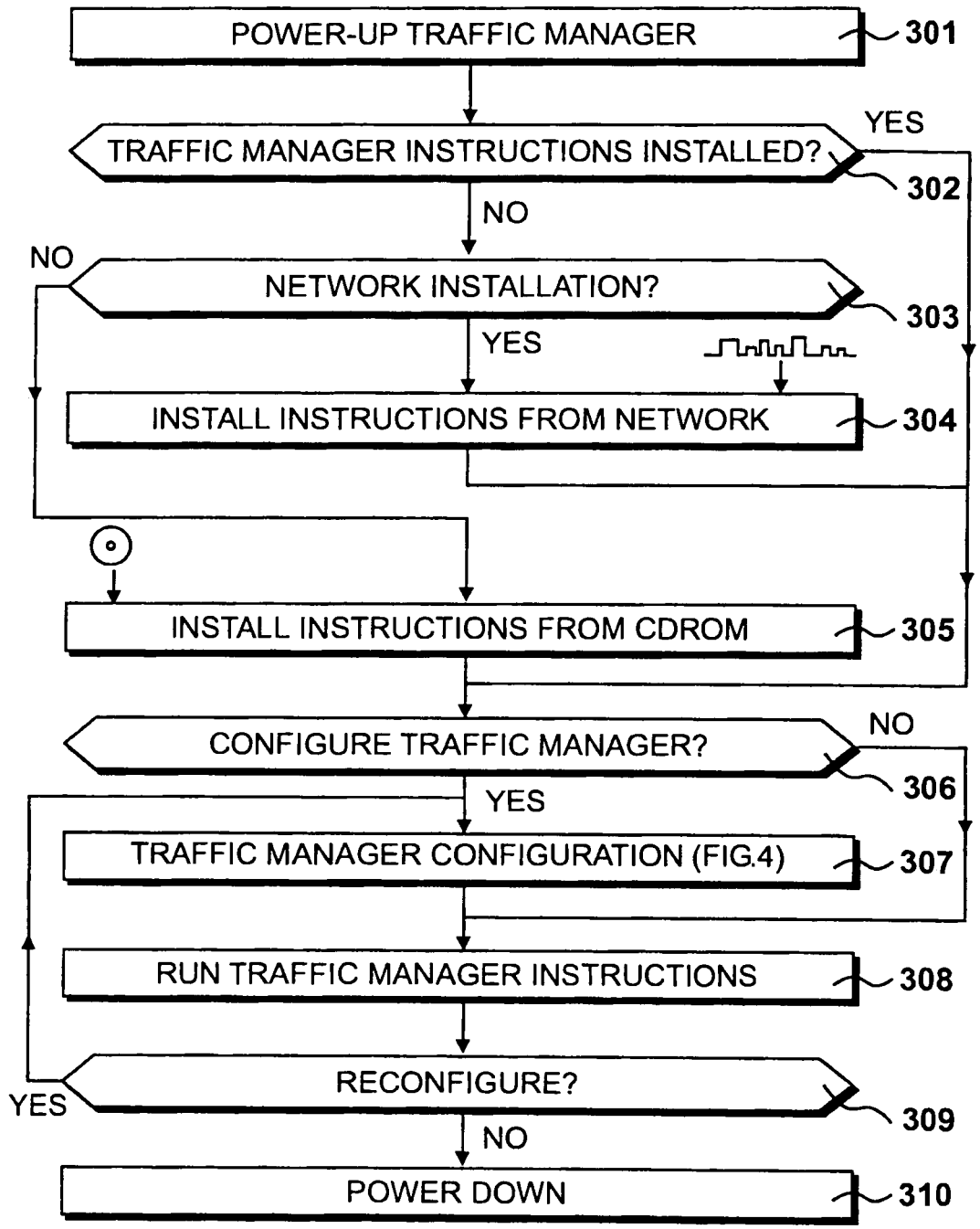
FIG. 3 shows operations performed by the traffic management system.

Operations performed with respect to the traffic management system 120 are illustrated in FIG. 3. At step 301 power is supplied to the system and a question is asked at step 302 as to whether instructions have been installed. When answered in the negative, a question is asked at step 303 as to whether a network installation is to be performed. When answered in the affirmative, instructions are installed from the network at step 304 or, alternatively, when answered in the negative, instructions are installed from CD-ROM at step 305.

At step 306 a question is asked as to whether the traffic management system is to be configured and when answered in the affirmative, system configuration is performed at step 307. When answered in the negative or upon completion of step 307, the traffic management instructions run at step 308.

Upon completion of the run, a question is asked at step 309 as to whether reconfiguration is required which, when answered in the affirmative, results in control returning to step 307 for the reconfiguration to be performed. When answered in the negative, the system is powered down at step 310.

FIG. 4

Figure 4:
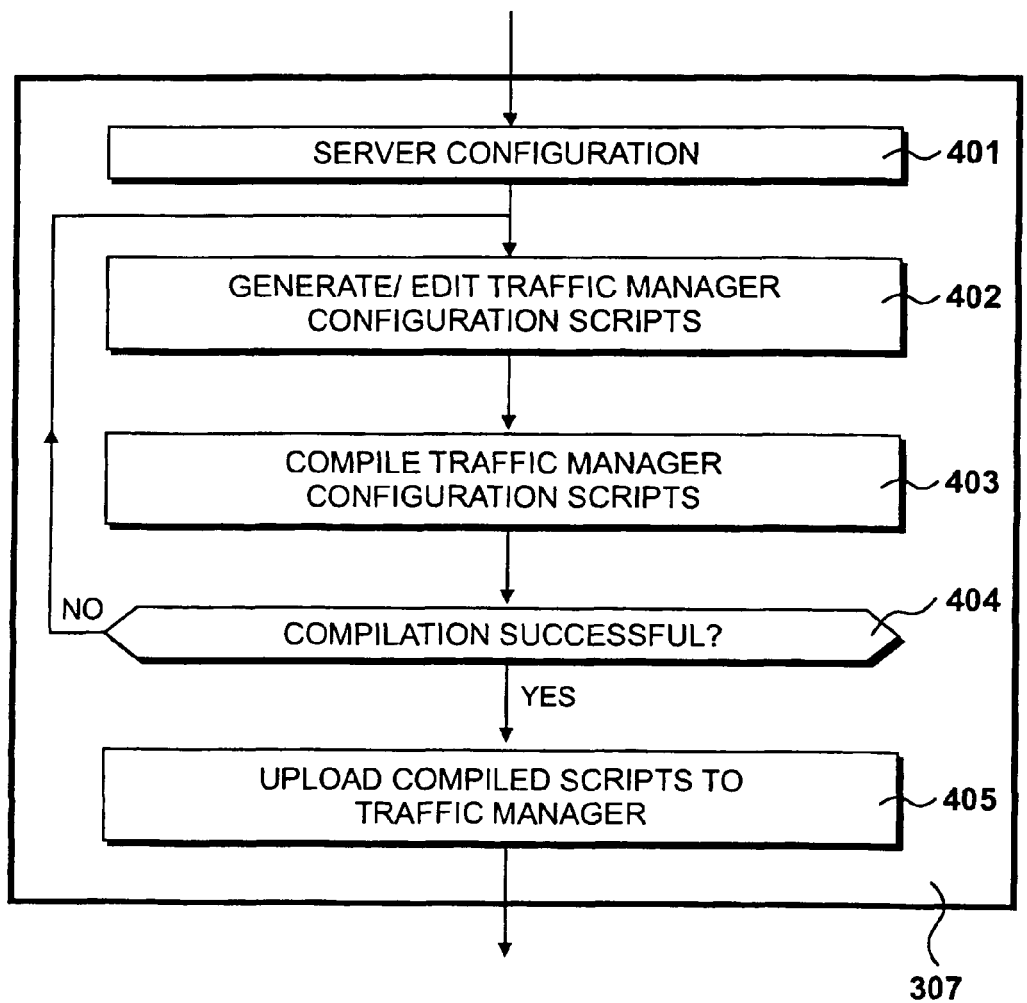
FIG. 4 shows procedures for configuring the traffic management system.

Procedures 307 shown in FIG. 3 for the configuration of the traffic management system are detailed in FIG. 4. At step 401 server configuration is performed which involves accessing configuration parameters for each of the servers 109 to 116. The individual servers are assigned to pools and this pool configuration data is then supplied to the traffic management system.

At step 402 traffic management configuration scripts are generated and edited as appropriate. The scripts are written in a high level language to simplify the definition of the decision making processes for traffic management and routing.

At step 403 the traffic management scripts are compiled by the execution of a compiler on the administration station 121. Thus, following this compilation exercise, binary executable instructions are generated for execution on a virtual processor, described below, running on the traffic management system 120.

The compilation of scripts may result in the generation of syntax or other errors which are identified by the compiler during the execution of step 403 and displayed to an operator at the administration station 121. If compilation is not successful, it is necessary for the errors to be fixed by an editing operation being performed on the offending script or scripts. Thus, at step 404 a question is asked as to whether compilation has been successful and if answered in the negative control is returned to step 402.

At step 405, following successful compilation, compiled scripts are uploaded to the traffic management system 120. The uploaded scripts are stored on hard disk drive 203, for subsequent loading into main memory 202 when the system 120 is operating. In an alternative embodiment, the traffic management system 120 includes a compiler and is passed the source text of the rule for compilation.

It is also possible for operational errors to be detected during the testing of new scripts, during trial runs of the traffic management system. Thus, when these situations occur, it is also necessary for an editing and recompilation process to be performed by an operator of the administration station. Alternatively, the editing and compilation may be performed at a different site, whereafter compiled instructions may be returned to the server environment, preferably via a secure link.

FIG. 5

Figure 5:
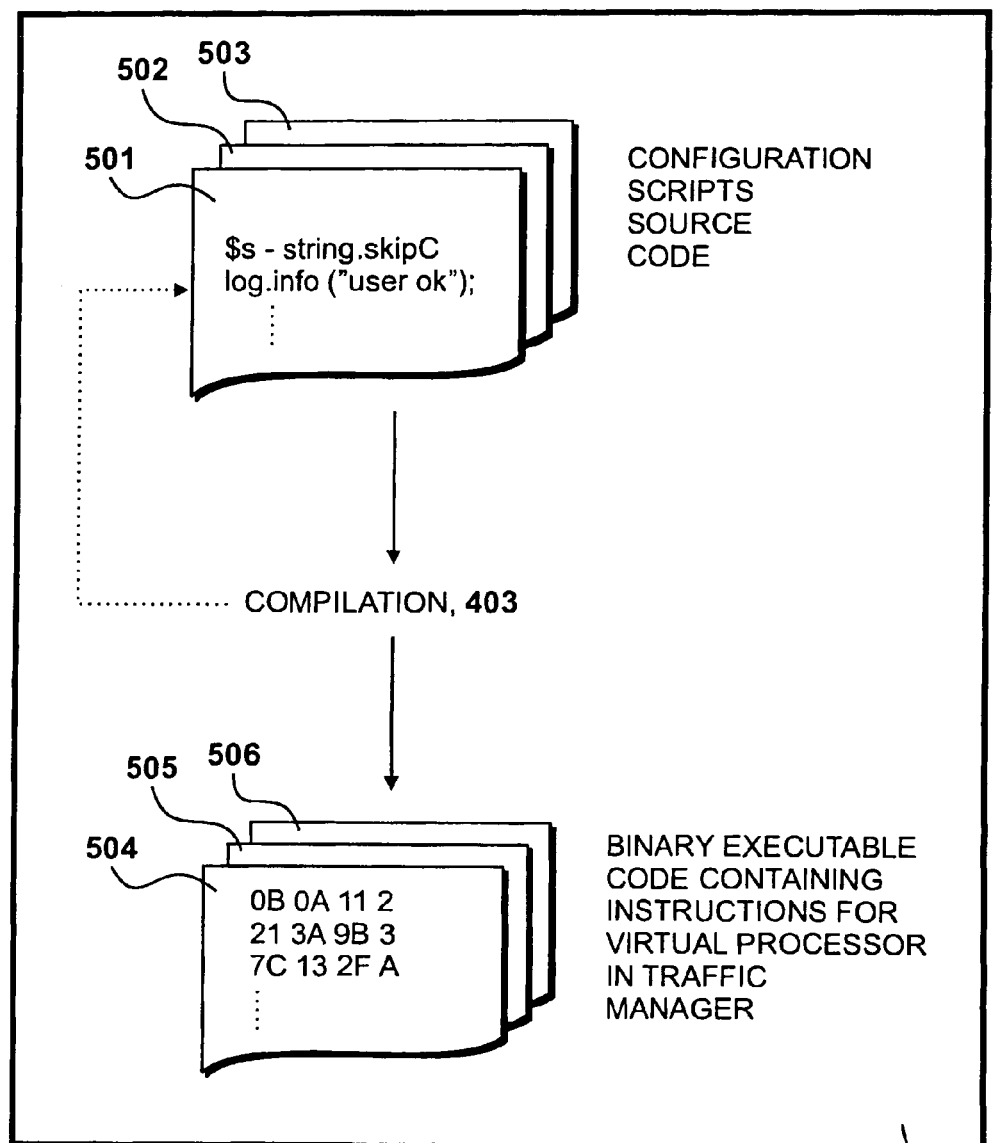
FIG. 5 shows an illustration of a compilation process.

An illustration of the compilation process is shown in FIG. 5. High level language configuration scripts 501 to 503 are compiled (by process 403) into respective files of binary executable code 504, 505 and 506 containing instructions for a virtual processor running on the traffic management system 120.

FIG. 6

Figure 6:
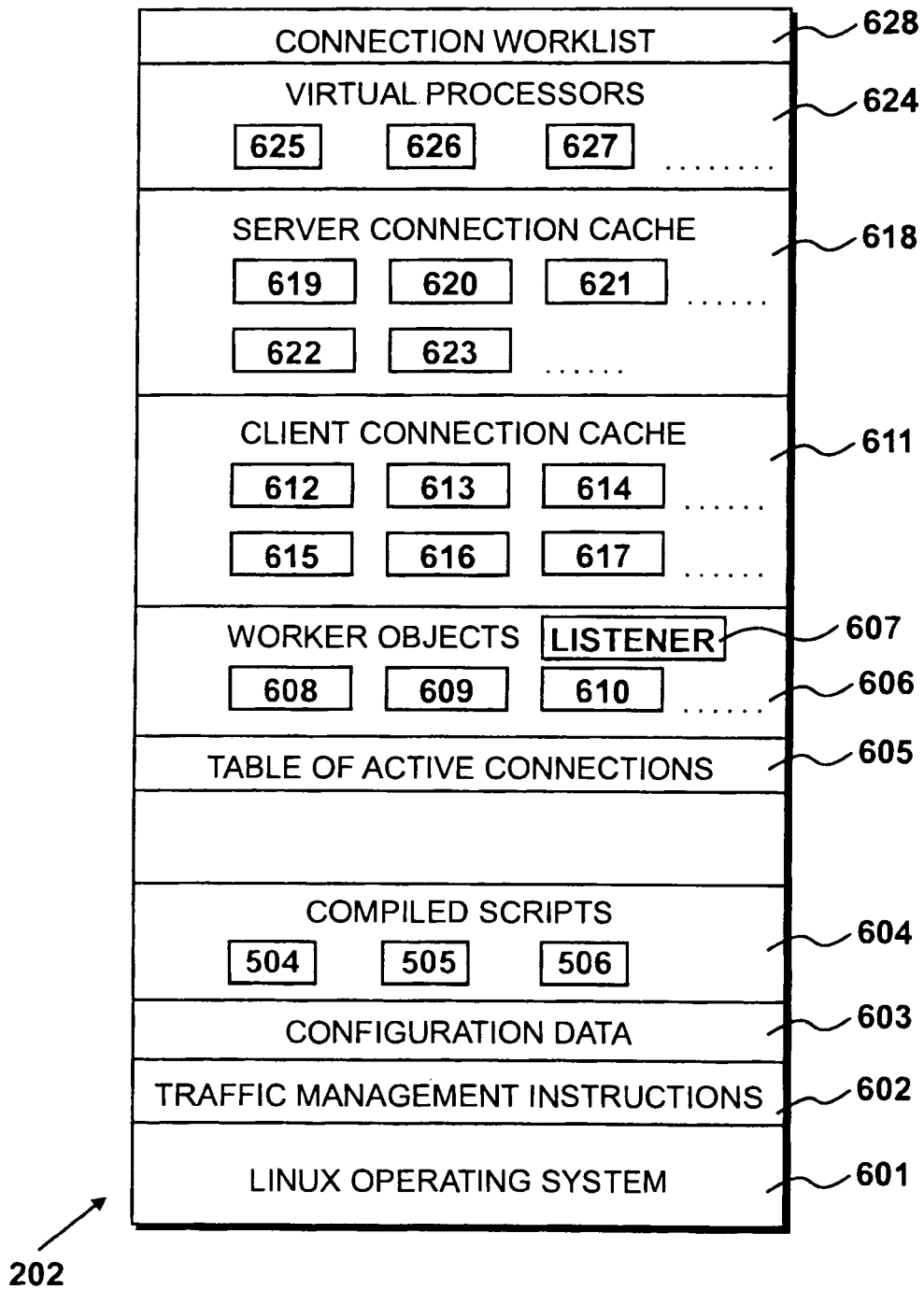
FIG. 6 shows an example of main memory contents.

An example of the data content of main memory 202 is given in FIG. 6. At 601, an operating system is stored, such as Linux® or another appropriate OS.

At 602 traffic management instructions are stored, derived possibly via an installation process from CD-ROM as previously described.

At 603 configuration data is stored, such as that defining the grouping of servers into pools, plus the IP address or addresses assigned to the traffic management system.

Compiled scripts, such as scripts 504, 505 and 506 previously described with reference to FIG. 5 are stored at 604.

At 605 a table of active connections is stored. Connections are made (typically TCP/IP connections) between the traffic manager 120 and the client browsers, which may be referred to as client-side connections. In addition, the traffic management system 120 also makes separate connections to the servers, which may be referred to as server-side connections. All of the established connections, client-side and server-side, are listed in the table of active connections, as detailed in FIG. 7.

At 606 worker objects are stored. Each connection has an associated worker object and these worker objects come in different forms, such that each has a specialised task. When the traffic management system starts up, it starts with a single worker object, specialised as a listener, illustrated at 607. The listener object 607 has the sole task of listening for incoming new connections from clients. The listener creates a new worker object (608) when it gets a new client trying to make such a connection. This new object is specialised as a "client manager" and client manager objects typically require access to the server so that these in turn create a "server manager" object 609.

Thus, the traffic management instructions make provision for the inclusion of a worker-based class, from which several other specialised classes inherit common functionality, such as the ability to read from and write to the TCP/IP connection. These derived classes are customised into different variants but generally, the worker objects, regardless of specialisation, are treated equally.

A client connection cache is provided at 611. The cache 611 stores connections from clients that can be reused by the client rather than establishing new connections. In the example shown, the client connection cache 611 includes cached client connections 612 to 617. These are connections that have been maintained by HTTP keep alive protocols, or are simply those which have not yet been disconnected by the client.

At 618 there is provided a server connection cache. Cache 618 stores details of cached connections to servers that can be reused. The cache includes details of cached server connections 619 to 623 and these connections are reused preferably on a most-recently-used (MRU) basis. Thus the cache operates an MRU-cache policy, since more recently used connections are less likely to be broken by the server through a timeout. The cached connections can only be reused if they provide connection to the required pool, so that the cache includes server-pool assignment information. Thus, in this way, it is possible to reuse at least one of the server-side connections for one or more of the client-side connections. This makes better use of the limited number of server-side connections available (effectively allowing them to be shared over a number of browsers) while at the same time minimising the re-establishment of connections which in turn reduces processor overhead.

At 624 instructions for virtual processors are stored, including virtual processors 625, 626 and 627. These virtual processors are created and deleted as required by the worker objects 606. Typically, a virtual processor object is created when a new client connection is made. The virtual processor object executes the compiled scripts 604, to determine whether traffic management actions need to be taken for the new connection. These actions include the possible instant discarding of the connection, without making connection to the server at all, which may occur, for example, for security reasons.

At 628 a connection work list is stored. During operation, the traffic management system may or may not require processing to be performed on each of the connections in the table of active connections. The connection work list indicates which of the active connections require work to be done. It also defines whether the work to be done includes a read, or write operation for the active connection.

Figure 7:
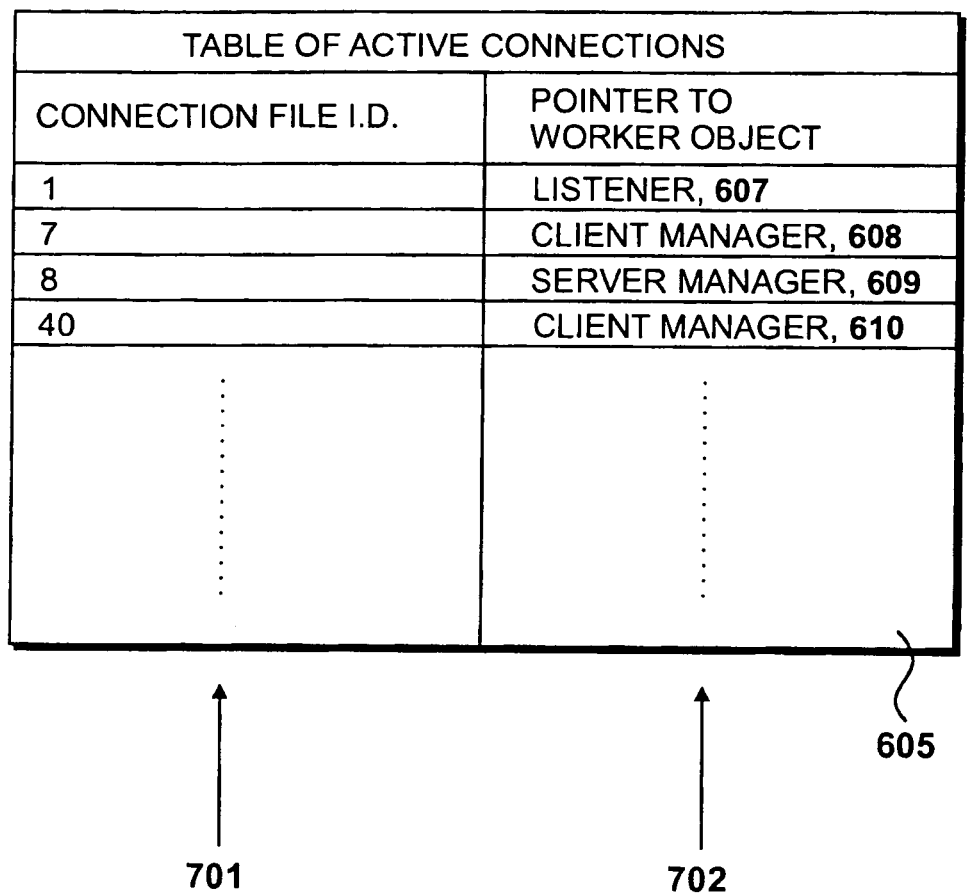
FIG. 7 shows a table of active connections.

A table of active connections 605 is detailed in FIG. 7.

FIG. 7

Each TCP/IP connection used by the traffic management system 120 is assigned a file ID by the operating system 601. The numerical value of the file ID is arbitrary and is provided as a unique way of identifying a connection.

The table of active connections associates active connections 701 with worker objects 702 that handle the connections. For example, the listener worker object 607 is associated with a connection that has a numerical file ID value (1). The client manager 608, the server manager 609 and another client manager 610 are each associated with a file ID (7, 8 and 40 respectively) for a particular connection.

When the traffic management system is started, only the listener object is present. However, as clients make requests, many hundred of such entries will exist in the table of active connections 605.

FIG. 8

Figure 8:
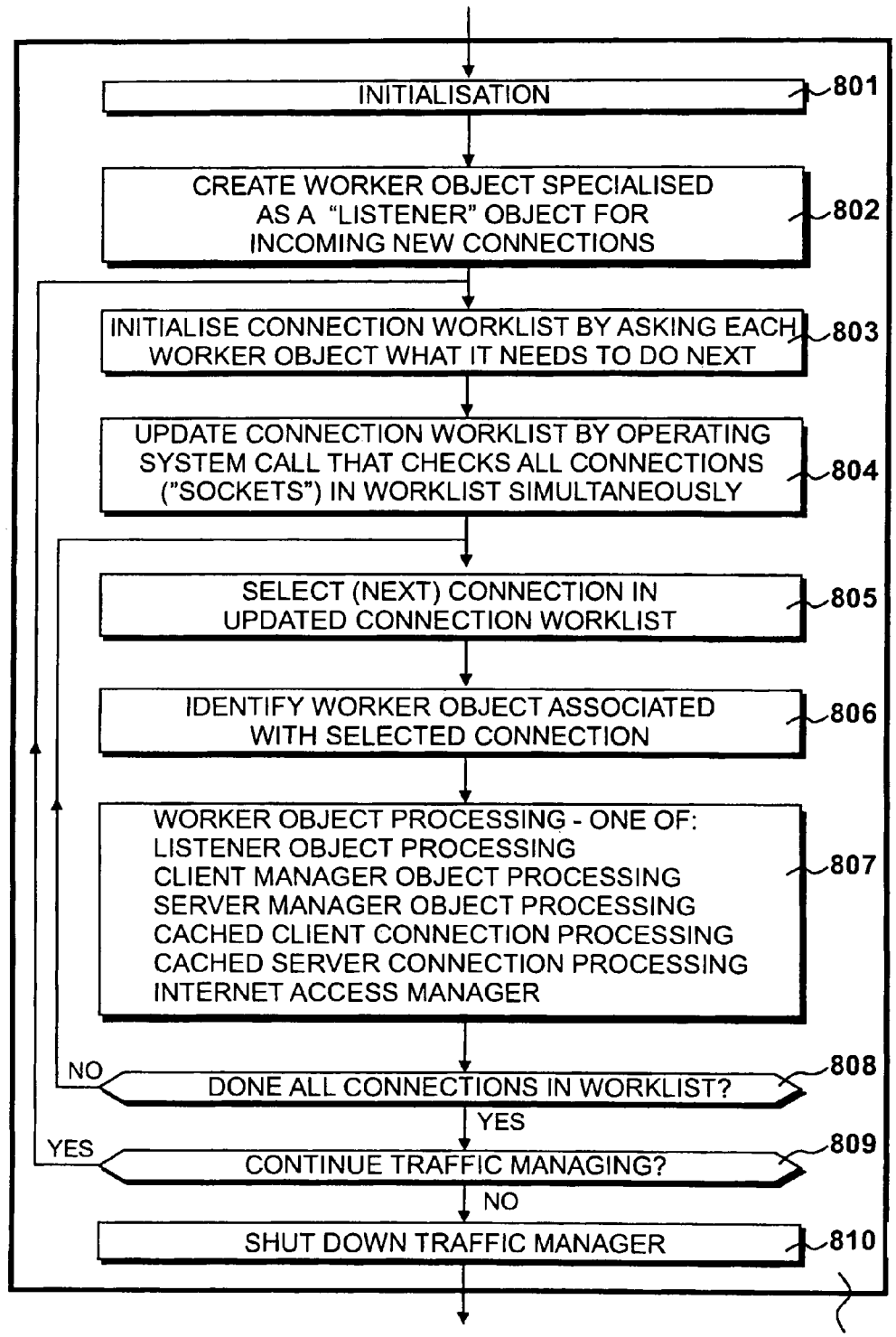
FIG. 8 shows the execution of traffic management instructions.

The execution of traffic manager instructions 308 (identified in FIG. 3) is detailed in FIG. 8.

At step 801 data structures are initialised and at step 802 a single worker object is created that specialises in listening (usually on port 80) for incoming client requests. This is the listener object 607.

At step 803 a connection work list 628 is initialised by asking each of the worker objects what it needs to do next, that is to say, whether the object needs to read, write or do nothing. Initially, there will only be the listener object, which always requests a read operation, on the basis that its purpose is to identify attempts made by clients to make open a connection.

There is a procedure for checking all connections using the operating system call select( ). This is called with three arguments, in the form select (arg1, arg2, arg3). When considered at the operating system level, connections of this type are usually referred to as "sockets" and when making this call, arg1 is the pointer to a bit field that specifies (by means of which bits are set and which bits are clear) which of the file IDs are to be read from. File IDs are numerical values such that, if bit1 is set in arg1, that means "read from the connection assigned to file ID No 1". By setting several of the bits, a request is made to see whether there is data available to be read from the corresponding connection. This operation does not read the data. What happens is that the set bits are cleared if there is no data to be read from that file ID. Thus, upon return from execution, the system is provided with a pattern of bits in arg1 that identify the requested connections from which data is available to be read.

A similar operation is performed for arg2 with respect to writing. Thus, connections for writing to are specified by setting bits and those that are still set in arg2 upon exit are those which are ready for writing to.

For the argument arg3, upon exit, bits are set for those connections where an exception (an error) condition has occurred. The connection work list 628 effectively supplies arguments arg1 and arg2 on entry to step 804. On exit from step 804, the connection work list has now been updated. Thus, having started with a list of connections for which work would like to be done, a list of connections is provided that are now ready for work to be done.

At step 805 a connection in the updated connection work list is selected. At step 806 the worker object associated with that connection is identified by consulting the table of active connections 605, as detailed in FIG. 7.

At step 807 processing is performed in response to the instructions of the worker object. Thus, this involves object processing for the worker types listener, client manager, server manager, cached client connection, cached server connection and Internet access manager. The cached connections have worker objects as various maintenance operations are required even though these connections are effectively dormant. In particular, an unused connection may be broken by the other party, meaning that it can no longer be used and should therefore be removed from the cache. Each client request includes information on whether the connection should be kept alive or closed. This information is removed by a traffic manager before the request is forwarded to a server. Similar information is included in server responses, and is likewise removed.

At step 808 a question is asked as to whether all connections in the work list have been serviced and when answered in the negative control is returned to step 805 whereupon the next connection is selected.

When the question asked at step 808 is answered in the affirmative, to the effect that all of the connections have been serviced, a question is asked at step 809 as to whether traffic management is to continue. When answered in the affirmative, control is returned to step 803 resulting in the re-initialisation of the connection work list. Alternatively, if the question asked at step 809 is answered in the negative, the traffic management system is shut down at step 810.

Thus, the operations shown in FIG. 8 represent the top-level procedures for the traffic management. Step 807 includes the creation and deletion of additional specialised worker objects as necessary. The performance of reading and writing data, using non-blocking I/O calls, is performed at step 807 and is detailed below.

In this embodiment, the system operates using a single operating thread or process thereby providing an advantage to the effect that operating system overheads associated with large numbers of threads are avoided. Typically, existing traffic managers and servers operate one thread per connection, thereby increasing the amount of memory and system processing required to set up, manage and maintain each connection. The system outlined in FIG. 1 avoids the need to do this and furthermore provides a framework within which non-blocking reads and writes to TCP/IP (and possibly UDP/IP) socket connections can be applied efficiently.

It is possible for multiple instantiations of the process shown in FIG. 8 to be provided on one or several processors or traffic managing systems, thereby maintaining these advantages even within a multi-processor system or other distributed processing environment.

Figure 9:
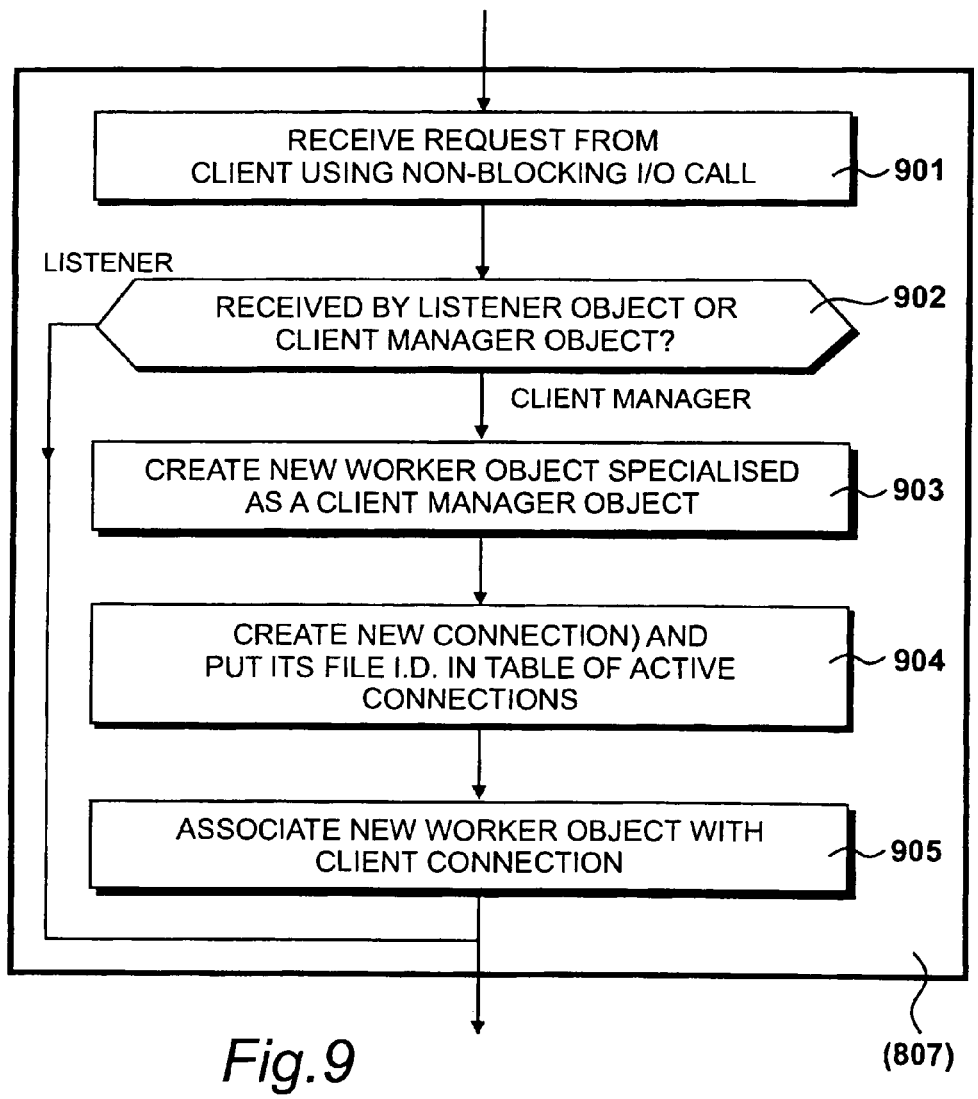
FIG. 9 shows operations performed by a listener object.

Operations performed at step 807 for a listener work object are detailed in FIG. 9.

FIG. 9

At step 901 a new request is received from a client. A listener object listens on port 80 (the standard port for making a new client request). A client issuing a request can either reuse an existing keepalive connection to the traffic manager or create a new TCP/IP connection on which to transmit the request.

Thus at step 902 a question is asked as to whether this request has been received by the listener object, meaning that a new connection is required, or by a client manager object in the connection cache. If it has been received by a client manager object then the cached connection for that object is to be used and so this procedure is completed.

If it is received by the listener object then at step 903 a new worker object specialising as client manager is created. Thus, for example client manager 608 would be created at this step because there is a client making a request for some data, such as a webpage, to be supplied from the server.

At step 904 a new connection (socket) is created and the file ID for this connection is entered in the table of active connections. To achieve this, a system call accept( ) is made. This takes the incoming client request, accepts it as a valid TCP request and sets up a new additional socket for the connection. The new worker object is associated with the client connection at step 905. The connection has its own unique file ID and a new entry is made in the table of active connections 605, associating the file ID for the connection with the new worker object which, in this example, is a worker object specialised as a client manager object 608.

The effect of steps 903 to 905 is to set up a client manager object for an incoming client request on a new channel. The client manager object has its own connection with the client that can be read from and written to as required. At this stage, it is not yet known which server is to be assigned to the new client.

Once the new client manager object has been created and is present in the list of active connections, it will be processed eventually as one of the worker objects and thereby dealt with in the main loop of steps 805 to 808.

Figure 10:
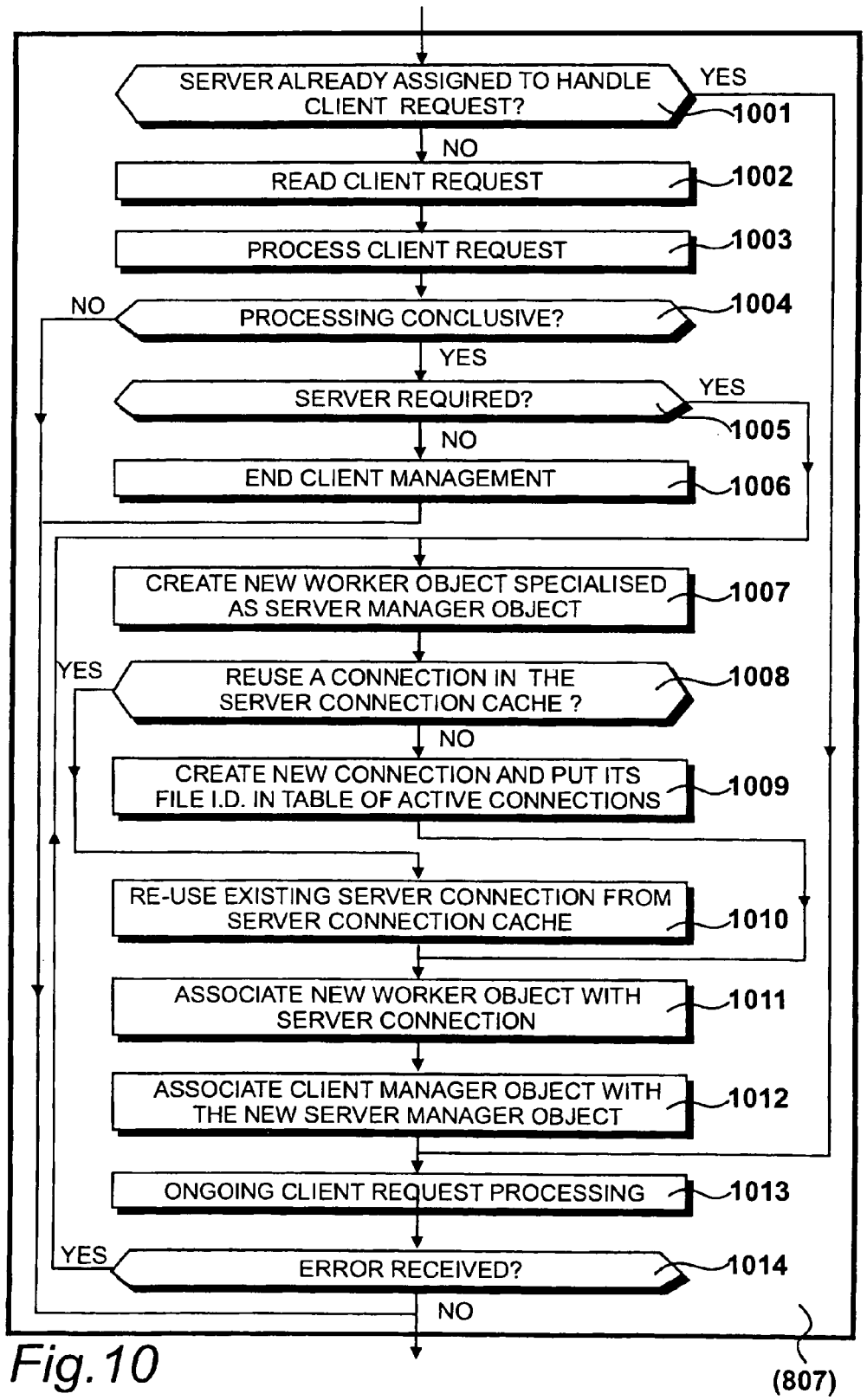
FIG. 10 shows client management procedures.

The processing procedures implemented by a client manager object are detailed in FIG. 10.

FIG. 10

At step 1001 a question is asked as to whether a server has already been assigned to handle the client request. Initially, when a client manager object 608 has been created, it will only have a connection with the client. It uses this connection to receive the request in full and to analyse it. Based upon this analysis, a server pool is chosen based on the nature of the request being made (for a secure transaction, dynamic content or static web content for example). The client manager object does not itself communicate directly with the server and this communication is facilitated by a server manager created for the purpose.

If the question asked at step 1001 is answered in the affirmative, to the effect that a server has already been assigned, control is directed to step 1013 for the ongoing client request processing. If the question asked at step 1001 is answered in the negative, a non-blocking read of the client request is made at step 1002.

At step 1002 the data from the client is read, so a certain amount of data is received but control is never interrupted, regardless of the quantity of data that is supplied by the client connection.

At step 1003 script-based processing of the client request is made, resulting in the request being analysed in accordance with the compiled scripts 604.

At step 1004 a question is asked as to whether the script-based processing is conclusive and when answered in the negative control is directed to step 808. It is possible that not enough data has been received from the client to analyse the request conclusively. If the script-based processing requires more data, processing states are stored for later recovery once more data has been received. However, for the time being, this concludes the client manager's processing operations given that no more can be done without the data.

At step 1005 a question is asked as to whether a server is required and when answered in the negative, this results in the end of client management at step 106 and again control effectively directed to step 808.

To reach step 1005, the script-based processing must have been successful and this typically results in an indication to the effect that a server from a particular pool is required. However, this is not always the result and sometimes a request is malformed or a time-out expires before enough data is received. In these cases, a server is not required and the client is discarded.

If a server is required, as identified at step 1005, the script-based processing will have defined which pool the server should belong to. It may also define other parameters, including specifying how requests should be modified before being passed to the server and also how server data should be modified before being passed to the client. In the embodiment, such modification procedures are important because the traffic manager must operate transparently between the client and server. However, this is often requires at least some modification of client requests. Complex modifications can occur, even to the extent that secure connections may be established between the client and the traffic management system and between the traffic management system and the server, so as to establish full end-to-end security, even when the traffic management system is analysing each new client request.

In response to the question asked at step 1005 being answered in the affirmative, control is directed to step 1007. At step 1007 a new worker object is created that specialises as server manager object. Thus, a server manager object is created to provide communication with a selected server.

At step 1008 a question is asked as to whether to reuse a connection in the server connection cache. Although the traffic manager generally uses the most-recently-used connection in the cache in preference to using any other cached connection or establishing a new connection, the answering of this question depends also on an analysis of which server will serve the client most quickly. Thus it may be quicker to open a new connection to a server that is currently processing only a few requests than to use a cached connection. Other factors could be that a server recently processed a similar request and thus might be expected to have the required information in its RAM, or that one server is known to be more reliable than another. Thus the traffic manager first decides whether there are available connections in the cache to be reused, and then decides between them or considers whether it would be better to use a new connection based on which server is likely to respond fastest to the client.

If the question asked at step 1008 is answered in the affirmative, to the effect that a cached connection is to be reused, control is directed to step 1010 resulting in the reuse of an existing server connection identified from the server connection cache.

If the question asked at step 1008 is answered in the negative, a new socket is created and its file ID is put in the table of active connections at step 1009.

The completion of step 1009 or step 1010 results in control being directed to step 1011. At step 1011 a new worker object is associated with the server connection.

At step 1012 the client manager object is associated with the new server manager object. Thus, at this stage, two worker objects have been established. The client manager 608 handles the connection between the traffic management system 120 and the client 103. The server manager object handles the connection between the system 120 and a server 115. An association with each other to allow data to pass between them is achieved in this example by each object having a pointer to the other. Data may be passed by exchanging pointers to buffers. The buffers may be circular buffers of limited size, thereby providing a flow control mechanism.

At step 1013 ongoing client request processing is conducted. Having set up the server manager object, there is now the potential for communication between the client and a server, which occurs at this stage. This is mainly the transfer of data from the server which is then subsequently modified by the traffic management system and supplied to the client.

At step 1014 a question is asked as to whether an error occurred while processing the client request. This can occur particularly when a cached connection is selected for reuse at the same time as the server decides to close the connection, for example due to a timeout. The traffic management system will receive an error when it attempts to issue a request down this closed connection. Thus if this question is answered in the affirmative control is returned to step 1007 to identify a new connection.

Figure 11:
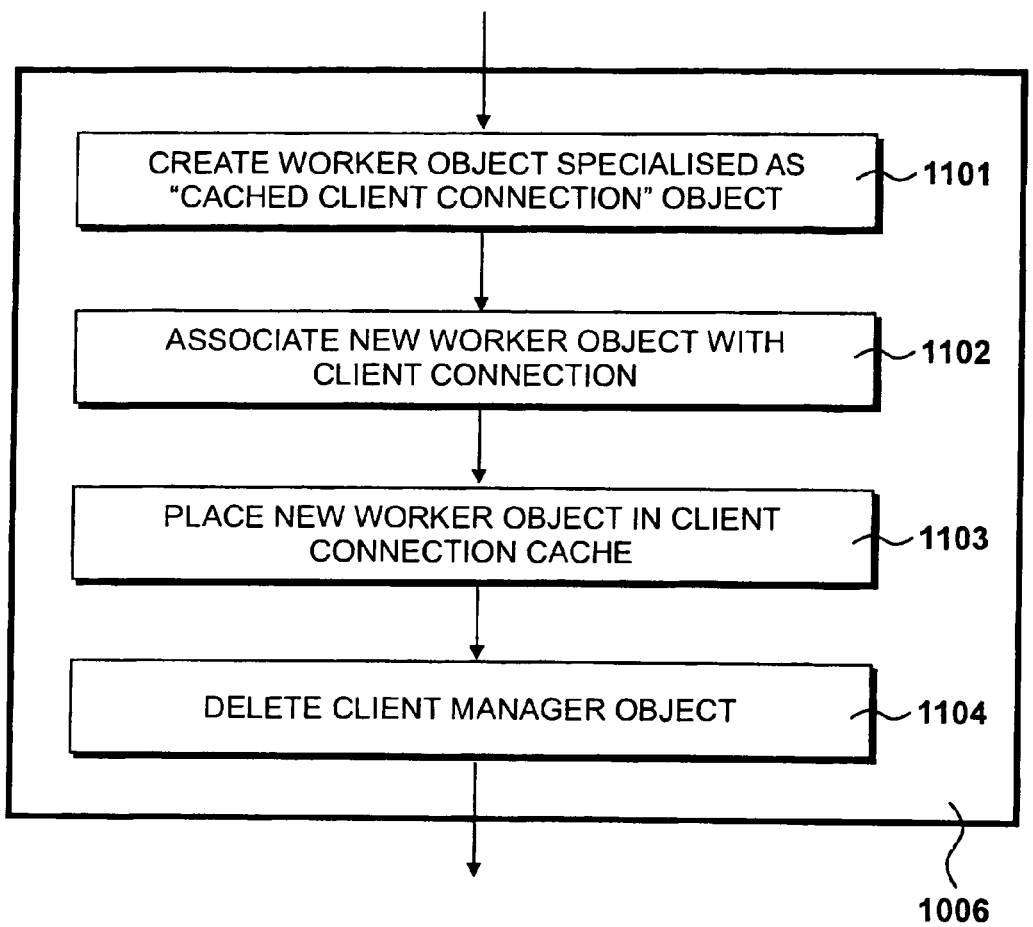
FIG. 11 shows procedures for ending client management.

Procedures 1006 for ending client management are detailed in FIG. 11.

FIG. 11

When ending client management, the previously used client connection can be put back into the client connection cache for possible reuse. Cached client connections have their own specialised worker objects in the form of cached client connection objects.

At step 1101 a cached client connection object is created as a new worker object specialised for this purpose.

At step 1102 the new worker object is associated with a client connection. Thus, in the table of active connections 605, the object associated with the client connection is changed from the client connection manager object to the new cached client connection object.

At step 1103 the new worker object is placed in the client connection cache. To implement this, a pointer to the new client connection object is stored in the client connection cache 611 (the client connection cache is configured to store pointers to these worker objects, not to the connections themselves).

At step 1104 the client manager object is deleted; the connection has been cached and the client manager is no longer required.

Figure 12:
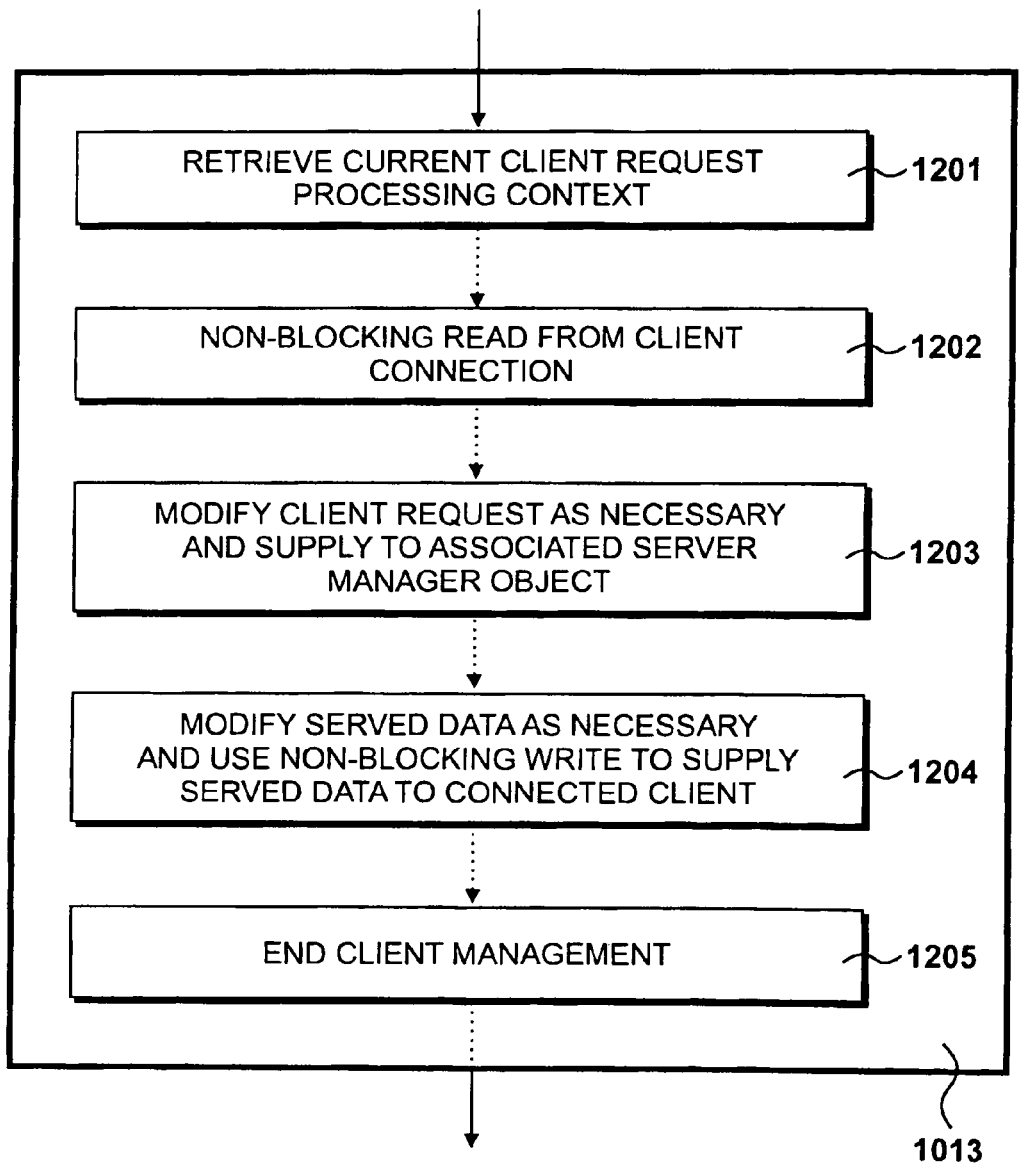
FIG. 12 shows ongoing client request processing.

Step 1013 for ongoing client request processing was identified in FIG. 10 and this is now detailed in FIG. 12.

FIG. 12

Steps identified in FIG. 12 are not completed in a single iteration. Each time the process detailed in FIG. 12 is encountered, the current processing context is retrieved at step 1201 and processing may then re-establish at any of steps 1202 to 1205, effectively where it left off previously.

Thus, at step 1201 the current client request processing context is retrieved. The client request processing context is a pointer to any of steps 1202 to 1205 identifying the point where processing in a previous iteration of the steps terminated. Thus, after step 1201, processing is resumed at any point in steps 1202 to 1205.

At step 1202 a non-blocking read operation is performed from the client connection so as to read as much data as is presently available on the client connection.

At step 1203 a client request is modified as necessary and supplied to the associated server manager. In the embodiment, this modification process may include decrypting a secure HTTPS connection.

At step 1204 served data is modified as necessary and supplied to the client. Served data is received from the associated server manager object and supplied to the connection client. Again, in the embodiment, this may include encrypting data for a secure HTTPS client connection.

At step 1205 the client management process ends.

FIG. 13

Figure 13:
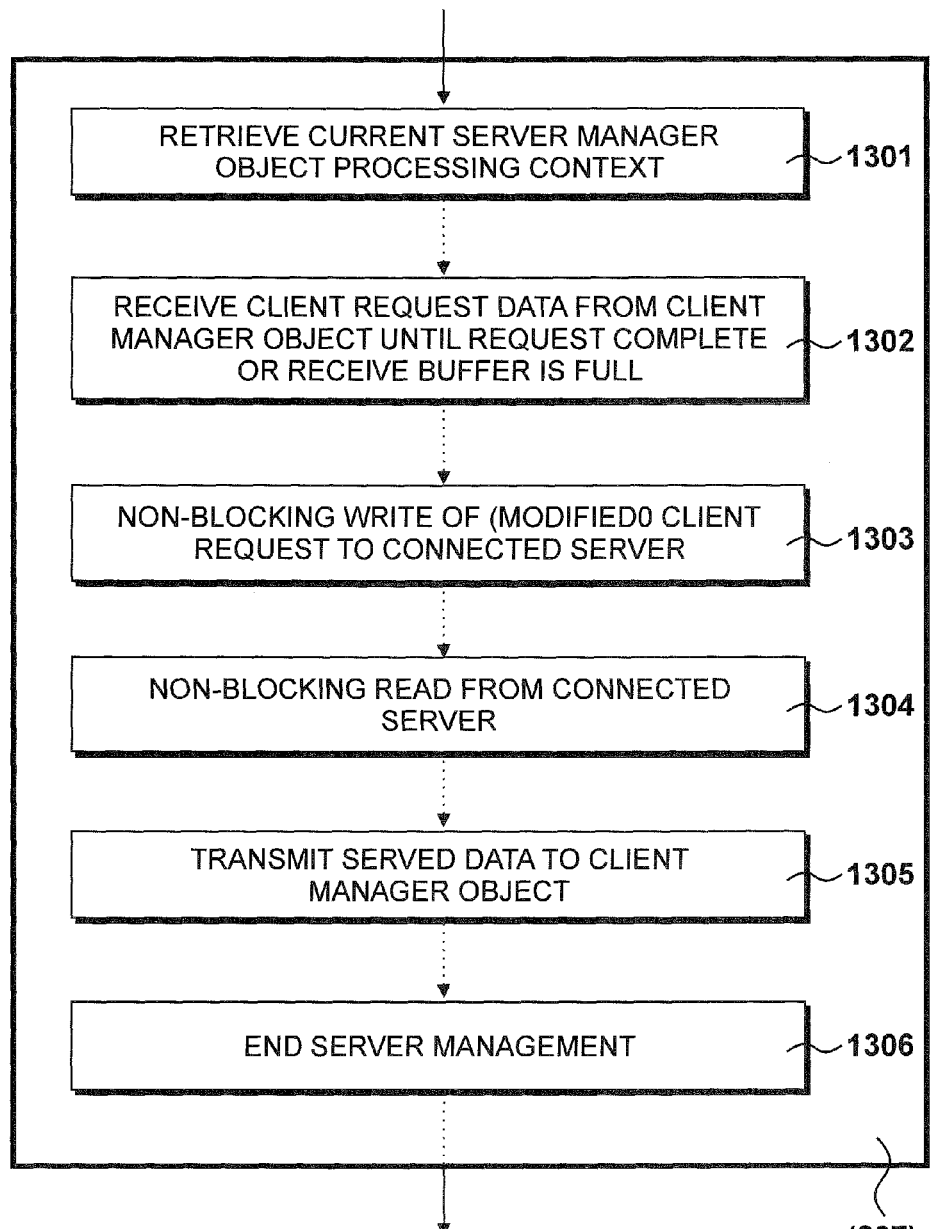
FIG. 13 shows server management processing.

Server manager object processing is detailed in FIG. 13. This represents the processing performed in response to the object created at step 1007 and again the steps are not completed in a single pass. Each time the processing is picked up, it continues after the point in steps 1302 to 1306 that it previously reached.

At step 1301 the current server object context is received, thereby resulting in the recommencement of processing from one of steps 1302 to 1305.

At step 1302 client request data is received from the client manager object until the request has been completed or until the buffer is full. The client manager object coupled with the server manager object it creates at step 1007. At step 1302, the server manager object picks up data (having been modified as necessary) from the client manager. It tries to get the full request so it can pass this on to the server. However, the request may not necessarily be complete or may be too long to fit in the buffer that is used to communicate between the client and server manager objects; there is a limit, given that there can be large numbers of worker-object pairs communicating in this way. If the request is not fully received, the context is saved and processing picks up at the same point in the next iteration.

At step 1303 a non-blocking write is made to the server connection of the client request, possibly in modified form. Thus, another non-blocking connection operation is provided, this time writing to the server connection.

At step 1304 a non-blocking read from the server connection is made, which is the point at which data is picked up from the server, ready to be supplied to the client.

At step 1305, data is transmitted to the client manager object. The client and server managers communicate with each other. This time, the server object supplies the data it has received from the server to the client manager object using internal memory buffers in main memory to facilitate this communication.

At step 1306, the server management ends. Once the full request and receive cycle is over (even if it is just for a single graphic for example) the server manager object is deleted and the connection it created (or re-used) is put in the server connection cache.

This process is described for protocols such as HTTP where the client "talks first". When using protocols where the server "talks first", such as SMTP or FTP, this process is slightly different.

Figure 14:
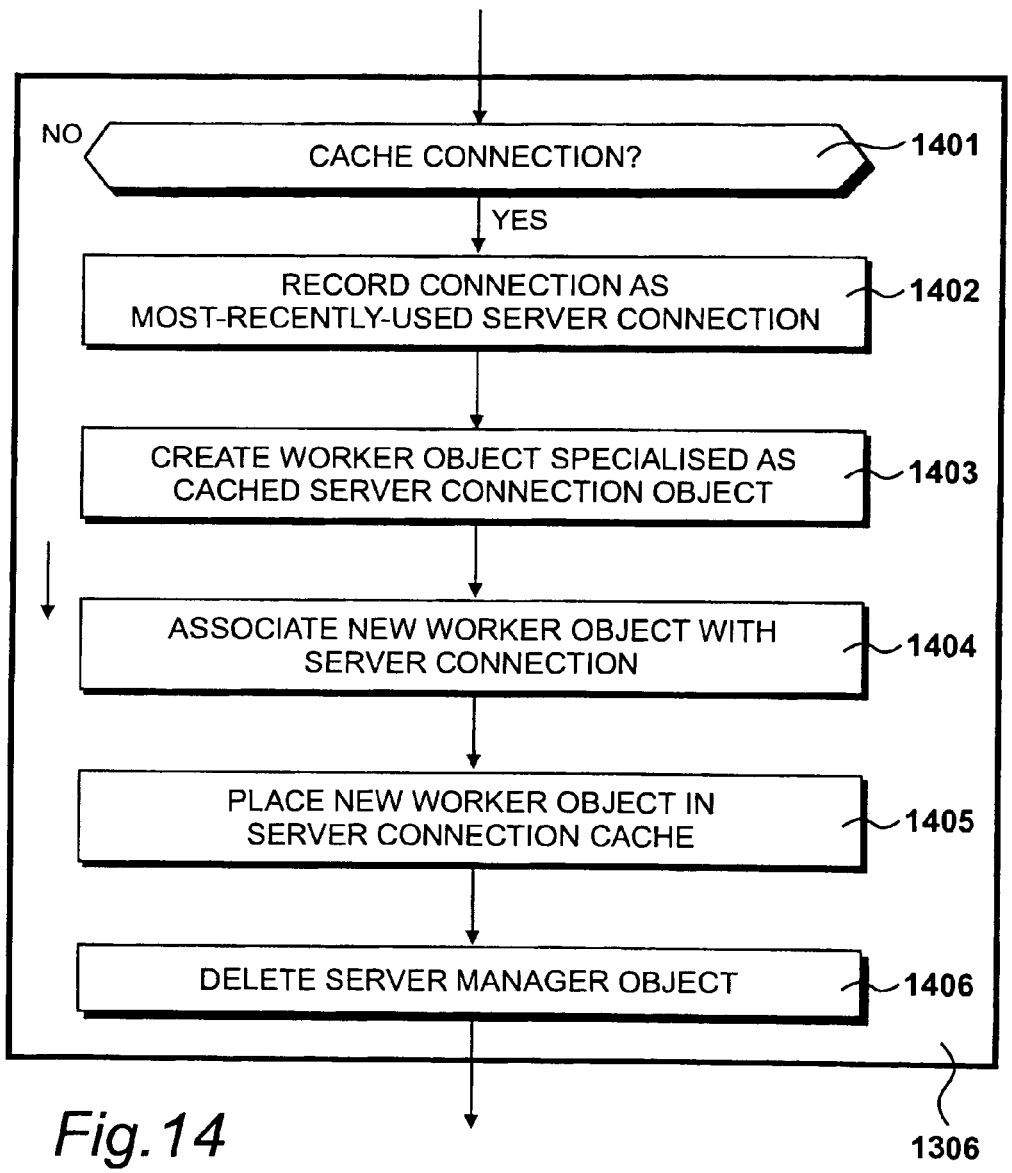
FIG. 14 shows the ending of server management.

Procedure 1306 for ending server management is detailed in FIG. 14.

FIG. 14

At step 1401, as part of the server management ending procedure 1306, a question is asked as to whether the connection is to be cached. A possible reason why a traffic manager might decide not to cache a connection is because it has a lot of cached connections to a server with a small concurrency limit, and caching more connections could result in other traffic managers being unable to access that server. Thus if the question is answered in the negative control is directed to step 1406 to discard the connection.

If the question is answered in the affirmative, then the connection is recorded as the most recently used server connection. Server connections are reused in part according to a MRU-cache policy, and therefore it is necessary to note the recency of connections as they are placed in the cache. This can be achieved, for example, by the ordering of a linked list of cached objects.

At step 1403, a worker object is created that specialises as a cached server connection object. Cached server connections require maintenance, and therefore each has its own specialised worker object as described below.

At step 1404, the new worker object is associated with the server connection. Thus, in the table of active connections 605 the object association is changed with the server connection from the server management object to the new cached server connection object.

At step 1405, the new cached server connection object is placed in the server connection cache 618. Thereafter, at step 1406, the server manager object is deleted.

FIG. 15

Figure 15:
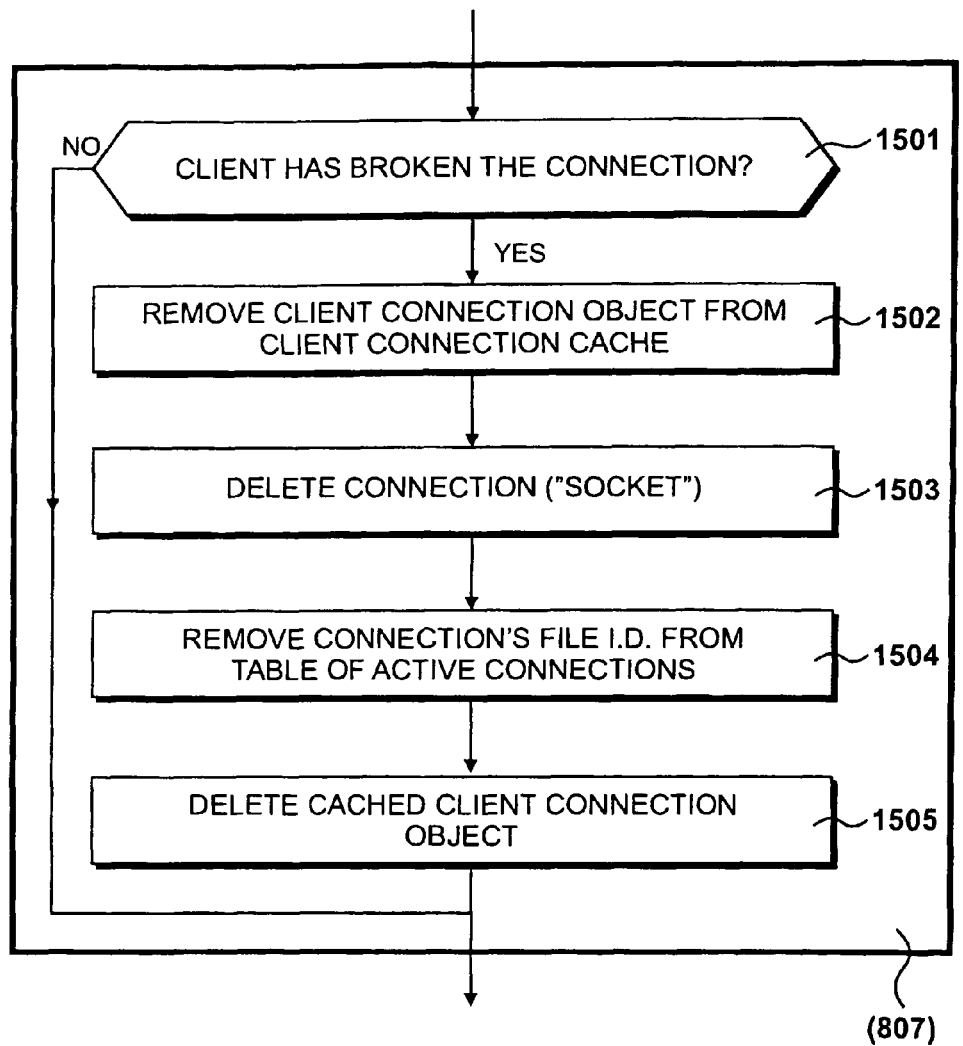
FIG. 15 shows details of a client connection object.

A worker object 612 in the client connection cache, representing a client connection, is detailed in FIG. 15. Maintenance may be required on cache connections in situations where the client breaks the connection. Thus, the procedures represent the object processing performed for a cached client connection.

At step 1501 a question is asked as to whether the client has broken the connection, with the procedure terminating if the question is answered in the negative.

If the question asked at step 1501 is answered in the affirmative, to the effect that the client has broken the connection, the client connection object is removed from the client connection cache at step 1502.

At step 1503 the socket is deleted and at step 1504 the connection's row entry in the table of active connections is removed. Thereafter, at step 1505 the cached client connection object is deleted.

FIG. 16

Figure 16:
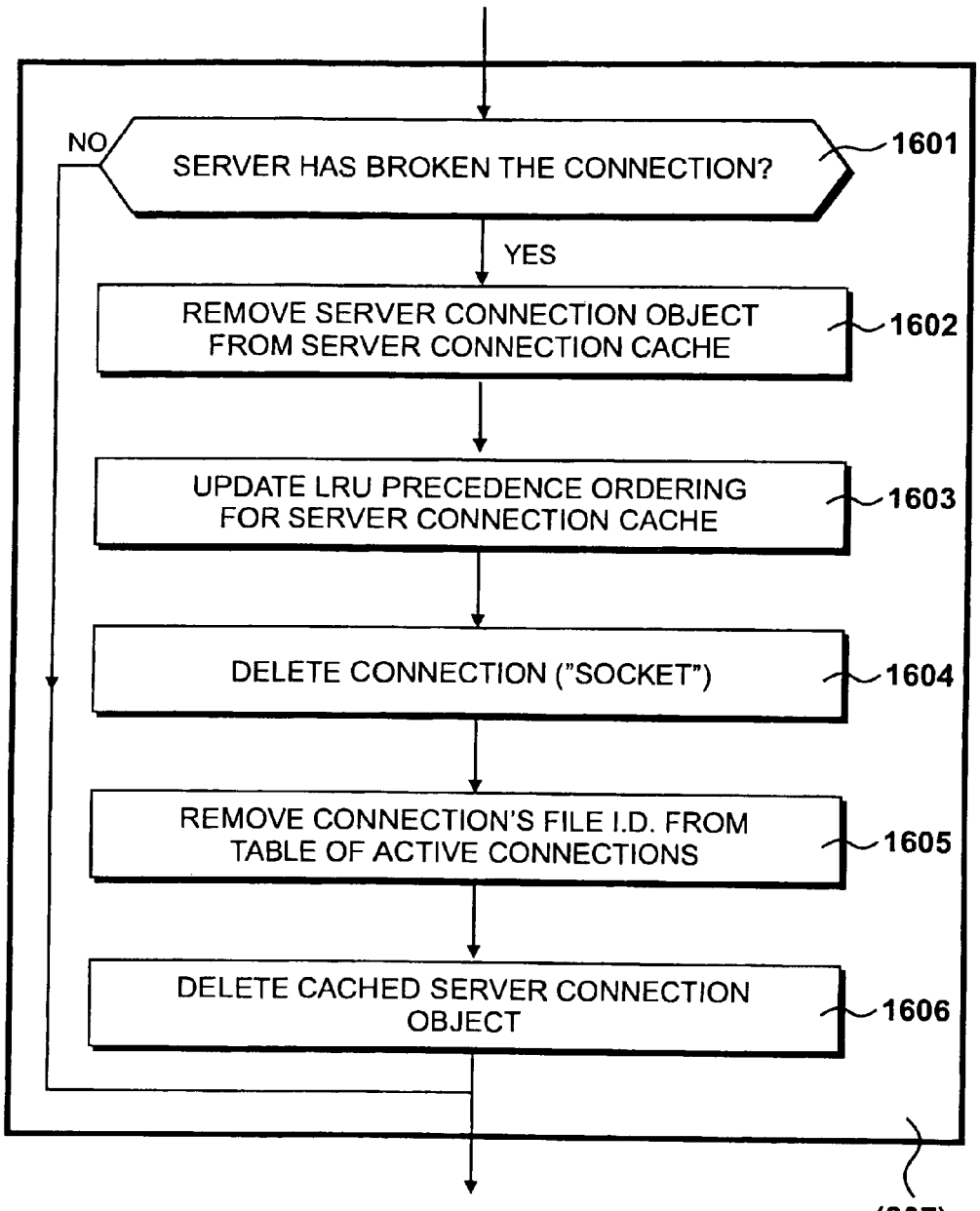
FIG. 16 shows the processing of a cached server connection object.

The processing of a cached server connection object is detailed in FIG. 16. This is required because a server may also break a connection (due to hardware failure for example) in which case the connection is not available and must be removed from the cache. Thus, the processing is similar to that required for cached client connections.

At step 1601 a question is asked as to whether the server has broken the connection. If answered in the negative, the procedure is terminated.

If the question asked at step 1601 is answered in the affirmative, to the effect that the server has broken the connection, the server connection object is removed from the server connection cache at step 1602.

At step 1603 the MRU precendence ordering for the server connection cache is updated. Thus, in this embodiment, the server connection cache preserves the recency ordering so that it knows which is the most recently used connection in each server pool. This may be implemented by a linked list, ordered according to recency. When a connection is removed from the cache, the next connection up and next connection down in the linked list are linked together, thereby excluding the unwanted connection.

At step 1604 a socket is deleted and at step 1605 the connection's file row entry ID is removed from the table of active connections. Thereafter, at step 1606, the cached server connection object is deleted.

In this embodiment, connections are reused whenever possible and server connections are reused multiple times. The effect of this is that for a client who is connected over several seconds (or even minutes), requests and responses are buffered by the traffic management system. The system picks up the most appropriate available server connection swiftly, sends the requests quickly and receives a quick response. The slow communication with the client can be continued. Meanwhile, the server and its connection have gone on to be reused, possibly by a different client altogether. Thus a layer of "network buffering" is provided between each client and server, meaning that each server application can operate very efficiently. By rewriting client requests and data, the servers need not be specifically programmed to take account of the presence of the traffic management.

The traffic management system itself is highly configurable in this embodiment and makes traffic management decisions according to sophisticated scripted configurations. In this way, it is possible to make best use of available server resources, both in terms of their suitability to particular serving operations (secure/dynamic/static) and also in terms of their available bandwidth. Servers have a limit to the number of simultaneous transactions they can maintain. Thus, by shortening the attention span required for each server request transaction, the total number of clients handled in a given time period is significantly increased for the same server capability.

FIG. 17

Figure 17:
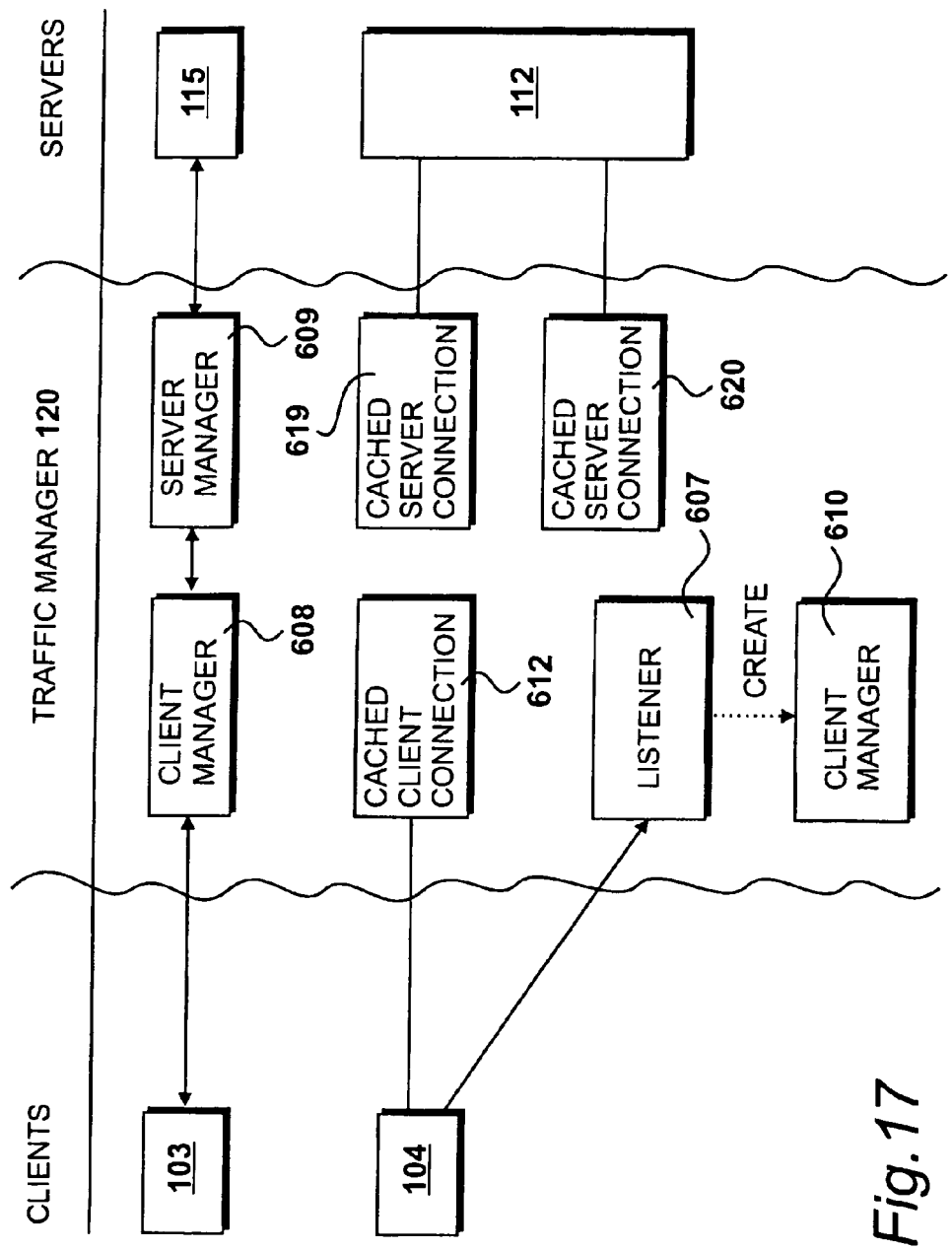
FIG. 17 shows a typical set of relationships.

A typical set of relationships of clients and servers, along with objects facilitating their communication on the traffic management system is illustrated in FIG. 17. Thus, client 103 is communicating with server 115 by the operations performed by a client manager object 608 and server manager object 609.

Client 104 wishes to establish communication and its request is identified by listener object 607. This results in the creation of a client manager object 610. Client connection with client 104 has been cached as recorded at 612. Similarly, connections to server 112 have been established and are presently inactive as illustrated by their cached server objects 619 and 620.

The invention claimed is:

1. A method for reusing connections between-clients and servers comprising:
   determining, from a plurality of available server pools, a server pool corresponding to an incoming client request, wherein each server pool in the available server pools is one of a secure transaction server pool, a dynamic content server pool, or a static content server pool;
   maintaining, for the server pool, a cache of active server-side connections for associating client side connections to server side connections, the cache of active connections indicative of open server-side connections not yet disconnected by the client and available for reuse;
   identifying, from the connections in the maintained cache, connections awaiting servicing by providing a single argument for all connections and receiving a single argument indicative of serviceable connections, wherein each of the connections corresponds to a file id;
   determining a ranking of the active connections in the cache of active connections based on a time left before the connection to a corresponding server is broken due to a server timeout;
   obtaining a reusable active connection based on the determined rank for each active connection, wherein the reusable active connection is an active connection in the cache of server-side connections that is least likely to be broken by a corresponding server due to a server timeout; and
   assigning the obtained reusable connection to the client side request.

2. The method of claim 1 further comprising receiving a client side request from an unknown client, wherein the unknown client has no current client connection allocation.

3. The method of claim 1 further comprising
   receiving a request from the client side connection; and
   selecting the corresponding server pool by analyzing the request based only on the nature of the client side request.

4. The method of claim 1 further comprising identifying the reusable connection based on those resulting from keep alive protocols of the underlying transport mechanism and non-termination of the reusable connection by the remote client.

5. In a service network environment having a plurality of servers responsive to clients for providing services over the service network via a traffic manager configured for allocating client side connections to an incoming request and allocating server side connections corresponding to a server responsive to the request by associating the client side connection to the server side connection, a method for reusing connections between the clients and servers comprising:
  identifying a client side connection receiving an incoming request from a client unknown to the traffic manager;
  determining, from a plurality of available server pools, a server pool corresponding to an incoming client request, wherein each server pool in the available server pools is one of a secure transaction server pool, a dynamic content server pool, or a static web content server pool;
  maintaining, for the server pool, a cache of active server-side connections for associating client side connections to server side connections, the cache of active connections indicative of open server-side connections not yet disconnected by the client and available for reuse;
  identifying, from the connections in the maintained cache, connections awaiting servicing by providing a single argument for all connections and receiving a single argument indicative of serviceable connections, wherein each of the connections corresponds to a file id;
  determining a ranking of the active connections in the cache of active connections based on a time left before the connection to a corresponding server is broken due to a server timeout;
  obtaining a reusable active connection based on the determined rank for each active connection, wherein the reusable active connection is an active connection in the cache of server-side connections that is least likely to be broken by a corresponding server due to a server timeout; and
  assigning the obtained reusable connection to the identified client side connection by associating the server side connection to the identified client side connection.

6. The method of claim 5 wherein the traffic manager is responsive to a previous request having longevity information indicative of whether the server side connection should be kept open or closed.

7. The method of claim 5 wherein the unknown client has no current client connection allocation to the traffic manager.

8. The method of claim 5 further comprising determining a most quickly serviceable server-side connection based on an analysis of which server will serve the client corresponding to the client side connection most quickly.

9. The method of claim 5 further comprising determining a reusable open server side connection based on determining a similarity of the incoming request to a recently processed request by determining a server having information required by the incoming request already stored in RAM.

10. The method of claim 9 wherein determining a similarity to a recently processed request further comprises identifying a server more reliable for handling the incoming request.

11. The method of claim 5, wherein the traffic manager is responsive to a previous request having longevity information indicative of whether the connection should be kept open or closed.

12. A network server for facilitating communication between a plurality of servers and a plurality of browsing clients in a service network environment having a plurality of servers responsive to the clients for providing services over the service network, comprising:
  a processor for executing instructions;
  an interface to a network for coupling clients to servers;
  a traffic manager, the network interface responsive to the traffic manager, configured for allocating client side connections to an incoming request and allocating server side connections corresponding to a server responsive to the request by associating the client side connection to the server side connection,
  a server-side connection cache, the traffic manager configured to:
    identify a client side connection receiving an incoming request via the interface from a client unknown to the traffic manager;
    determine, from a plurality of available server pools, a server pool corresponding to an incoming client request, wherein each server pool in the available server pools is one of a secure transaction server pool, a dynamic content server pool, or a static web content server pool;
    maintain, for the server pool, a cache of active server-side connections for associating client side connections to server side connections, the cache of active connections indicative of open server-side connections not yet disconnected by the client and available for reuse;
    identifying, from the connections in the maintained cache, connections awaiting servicing by providing a single argument for all connections and receiving a single argument indicative of serviceable connections, wherein each of the connections corresponds to a file id;
    determine a ranking of the active connections in the cache of active connections based on a time left before the connection to a corresponding server is broken due to a server timeout; and
    obtain a reusable active connection based on the determined rank for each active connection, wherein the reusable active connection is an active connection in the cache of server-side connections that is least likely to be broken by a corresponding server due to a server timeout; and
  a server manager configured to assign the obtained reusable connection to the identified client side connection from the determined server pool corresponding to the incoming request and by associating the server side connection to the identified client side connection.

13. The server of claim 12 wherein the unknown client has no current client connection allocation to the traffic manager.

14. The server of claim 12 further comprising determining a most quickly serviceable server-side connection based on an analysis of which server will serve the client corresponding to the client side connection most quickly.

15. The server of claim 12 further comprising determining a reusable open server side connection based on determining a similarity of the incoming request to a recently processed request by determining a server having information required by the incoming request already stored in RAM.

16. The server of claim 15 wherein determining a similarity to a recently processed request further comprises identifying a server more reliable for handling the incoming request.

17. The server of claim 12 wherein the traffic manager is responsive to a previous request having longevity information indicative of whether the connection should be kept open or closed.

* * * * *